United States Patent
Hiatt

(10) Patent No.: US 10,723,167 B2
(45) Date of Patent: *Jul. 28, 2020

(54) STRUCTURALLY COMPACT BACKLIT DISPLAY ASSEMBLY

(71) Applicant: REVOLUTION SIGN AND MEDIA GROUP LLC, Springfield, OR (US)

(72) Inventor: Richard Wendell Hiatt, Springfield, OR (US)

(73) Assignee: REVOLUTION SIGN AND MEDIA GROUP LLC, Springfield, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/012,256

(22) Filed: Jun. 19, 2018

(65) Prior Publication Data
US 2018/0297391 A1    Oct. 18, 2018

Related U.S. Application Data

(63) Continuation-in-part of application No. 15/589,980, filed on May 8, 2017, now Pat. No. 9,809,050, and a
(Continued)

(51) Int. Cl.
*G09B 29/00*    (2006.01)
*B43L 1/12*    (2006.01)
(Continued)

(52) U.S. Cl.
CPC ............ *B43L 1/12* (2013.01); *A63B 71/0619* (2013.01); *B43L 1/004* (2013.01); *B43L 1/008* (2013.01);
(Continued)

(58) Field of Classification Search
USPC ............... 434/408, 416, 421, 425, 428, 430; 40/600, 311.1, 711, 768, 771
See application file for complete search history.

(56) References Cited

U.S. PATENT DOCUMENTS 5,309,659 A    5/1994    Eastman
5,655,323 A    8/1997    Lassoff
(Continued)

FOREIGN PATENT DOCUMENTS

KR    101459310 B1    11/2014
KR    101618861 B1    5/2016

OTHER PUBLICATIONS

International Search Report and Written Opinion of international application PCT/US2017/040125 dated Feb. 1, 2018.

*Primary Examiner* — Kurt Fernstrom
(74) *Attorney, Agent, or Firm* — Timothy E. Siegel Patent Law, PLLC; Timothy E. Siegel

(57) ABSTRACT

A display assembly, having a base comprised of polymeric material, and having a front wall of at least one hundred square centimeters in area, and a rearward-extending base peripheral wall of at least 0.5 cm height. The front wall has raised regions and recessed regions that extend at least as far back as the peripheral wall at its furthest rearmost extent, so that when the base is placed against a flat surface the back of the recessed regions touches the flat surface. A polymeric cover is adapted to tension fit to the base, the polymeric cover including a generally transparent front wall. Translucent display media interposed between the base and the cover and a set of energy efficient lighting devices disposed in the recessed regions.

19 Claims, 20 Drawing Sheets

Related U.S. Application Data continuation-in-part of application No. 14/679,979, filed on Apr. 6, 2015, now Pat. No. 9,779,639.

(60) Provisional application No. 61/975,580, filed on Apr. 4, 2014.

(51) Int. Cl.
  *B43L 1/00* (2006.01)
  *A63B 71/06* (2006.01)
  *G09F 9/37* (2006.01)
  *B43L 5/02* (2006.01)

(52) U.S. Cl.
  CPC ............ *B43L 5/022* (2013.01); *G09B 29/002* (2013.01); *G09F 9/375* (2013.01)

(56) References Cited

U.S. PATENT DOCUMENTS

| | | | |
|---|---|---|---|
| 5,741,561 A | 4/1998 | Lenkin | |
| 5,822,895 A | 10/1998 | Risdal | |
| 6,241,528 B1 | 6/2001 | Meyers | |
| 6,374,523 B1 | 4/2002 | Smith | |
| 7,219,460 B1 | 5/2007 | Grayson | |
| 7,246,458 B2 | 7/2007 | Ternovits | |
| 7,874,842 B2 | 1/2011 | Beno | |
| D688,745 S | 8/2013 | Lyons | |
| 8,608,486 B1 | 12/2013 | Brashear | |
| 8,641,426 B2 | 2/2014 | Yang | |
| 8,672,687 B2 | 3/2014 | Shanbour, III | |
| 8,959,817 B1 | 2/2015 | Barnes | |
| 9,449,539 B2 * | 9/2016 | Sciackitano | G09F 13/18 |
| 9,779,639 B1 | 10/2017 | Hiatt | |
| 9,809,050 B1 | 11/2017 | Hiatt | |
| 9,945,539 B1 * | 4/2018 | Su | G09F 13/04 |
| 10,229,591 B2 * | 3/2019 | Baek | G09F 13/22 |
| 10,338,427 B2 * | 7/2019 | Nitanai | G02F 1/133606 |
| 2005/0152267 A1 | 7/2005 | Hamilton | |
| 2006/0070287 A1 | 4/2006 | Shaw | |
| 2007/0099510 A1 | 5/2007 | Beno | |
| 2008/0047182 A1 | 2/2008 | Uccello | |
| 2009/0068632 A1 | 3/2009 | Thomspon | |
| 2009/0199445 A1 | 8/2009 | Blaeser | |
| 2010/0046198 A1 * | 2/2010 | Hoffman | G09F 13/22 362/84 |
| 2011/0091860 A1 | 4/2011 | Supera | |
| 2011/0247248 A1 | 10/2011 | Dowd | |
| 2013/0101979 A1 | 4/2013 | Shanbour, II et al. | |
| 2013/0106055 A1 | 5/2013 | Knox | |
| 2013/0323707 A1 | 12/2013 | Lyons et al. | |
| 2013/0326922 A1 | 12/2013 | Lyons et al. | |
| 2014/0154661 A1 | 6/2014 | Bookbinder | |
| 2014/0199678 A1 | 7/2014 | Tunis | |
| 2014/0315184 A1 | 10/2014 | Jorgensen | |
| 2014/0333987 A1 * | 11/2014 | Keam | G02F 1/167 359/296 |
| 2014/0377736 A1 | 12/2014 | Essen | |
| 2015/0225614 A1 * | 8/2015 | Kim | B32B 37/24 428/317.3 |
| 2016/0125772 A1 * | 5/2016 | Li | G09F 13/18 40/544 |
| 2018/0025669 A1 | 1/2018 | Hiatt | |
| 2018/0117885 A1 * | 5/2018 | Kim | C09J 7/20 |

* cited by examiner

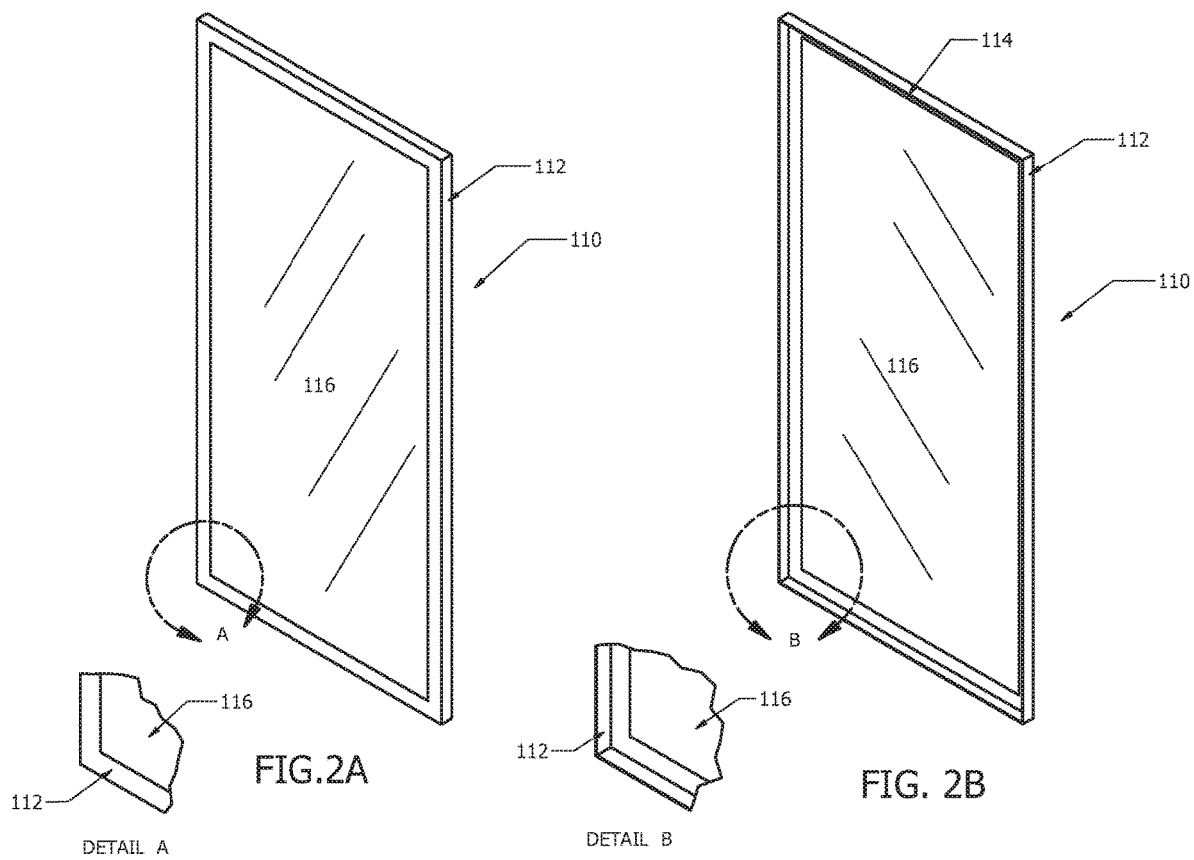

STRUCTURALLY COMPACT BACKLIT DISPLAY ASSEMBLY

RELATED APPLICATIONS

This application is a continuation-in-part of application U.S. Ser. No. 15/589,980 filed on May 8, 2017, now U.S. Pat. No. 9,809,050. This application is also a continuation-in-part of U.S. Ser. No. 14/679,979 filed on Apr. 6, 2015, now U.S. Pat. No. 9,779,639, which claims benefit of provisional application U.S. Ser. No. 61/975,580 filed on Apr. 4, 2014, which are incorporated by reference as if fully set forth herein.

BACKGROUND

A type of display board is currently available for providing an interchangeable background, covered by a transparent acrylic sheet. In one style of this type of board, the acrylic sheet is mounted to a hinge at its top and retained by magnets at its bottom. The magnets are attracted to a steel sheet that is about 0.32 mm thick, to which the acrylic sheet hinge is also mounted. To provide or change the semi-permanent display, the cover is opened and printed media, in the form of printed coated paper or polymeric material is placed over the steel sheet, and the Plexiglass cover is closed. This provides the user with a board having a printed background, but that he can write on with a marker, and later erase. As an example, a basketball coach may want a board having a basketball court scheme as a background, upon which he can draw basketball plays. Using the board described above he could order a basketball court scheme on cardboard or polymeric media and place it between the metal backing and the acrylic sheet cover, close the cover, and then mark the plays on the acrylic sheet. During football season the board could be provided with a football scheme background and provided to the football coach, who could draw football plays on it. In a medical environment, a board assembly in an ear, nose and throat specialist's office could be used to show a background media of the human throat, permitting the physician to mark on the clear plastic over this media, to illustrate a throat procedure. The same style of board could be used in a cardiologist's office with media showing the interior of the human heart, to permit the cardiologist to explain a cardiac procedure to a patient.

Unfortunately, many of the available boards of this nature are problematic. First, many include a wood backing to the steel sheet, thereby making the board quite heavy. Moreover, wood forming a portion of the board causes the board's use to be prohibited in many portions of a hospital, including patient rooms. Any porous material, such as wood, provides places for microbes to dwell, where it is difficult for sanitizing agents to reach. Also, as the principal structure of the board is wood, the steel sheet tends to be quite thin, on the order of a third of a millimeter. Also, a frame is generally used to hide the layered construction from users, and to forestall potential delamination. This adds to the weight of the board and provides additional covered areas for harmful microbes to live.

Further, in some hospital rooms a "terminal cleaning" is performed when a patient with a highly infectious condition is discharged. In this procedure, everything in the room is hosed down with bleach. Boards that include wood or a laminated panel as part of their construction tend to be damaged by being exposed to large amounts of bleach water. In like manner, boards containing wood may also be more vulnerable to becoming warped if left outside in the rain, as an advertising sandwich board might be left.

Finally, the differing coefficient of thermal expansion of the wood versus the steel sheet tends to cause warping in the steel sheet. It appears that this has necessitated the use of a thicker acrylic sheet than would otherwise be necessary, so that the weight of the acrylic sheet can hold the media in place, even against an uneven backing surface.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a display assembly, having a base comprised of polymeric material, and having a front wall of at least one hundred square centimeters in area, and a rearward-extending base peripheral wall of at least 0.5 cm height. The front wall has raised regions and recessed regions that extend at least as far back as the peripheral wall at its furthest rearmost extent, so that when the base is placed against a flat surface the back of the recessed regions touches the flat surface. A polymeric cover is adapted to tension fit to the base, the polymeric cover including a generally transparent front wall. Translucent display media interposed between the base and the cover and a set of energy efficient lighting devices disposed in the recessed regions.

In a second separate aspect, the present invention may take the form of a display assembly, having a base comprised of polymeric material, having a front wall of at least one hundred square centimeters in area, and a rearward-extending base peripheral wall of at least 0.5 cm height. The front wall has raised regions and recessed regions, and the recessed regions are recessed such that their backs extend at least as far back as the peripheral wall at its furthest rearmost extent, so that when the base is placed against a flat surface the back of the recessed regions touch the flat surface. Also, a polymeric cover is adapted to fit over the base, the polymeric cover including a generally transparent front wall, and a rearward extending cover peripheral wall, sized to fit about the base peripheral wall, so that when the cover is placed over the base there is a slight tension between the cover peripheral wall and the base peripheral wall. Finally, display media is interposed between the base and the cover.

In a third separate aspect, the present invention may take the form of a method of updating an electrophoretic display, that utilizes an electrophoretic display capable of receiving and displaying a transmitted digital photograph, a marker and a digital camera capable of transmitting digital images to a destination, the display including a transparent cover that can be marked on by the marker. An image is displayed on the electrophoretic display, and markings are made on the cover with the marker. A digital photograph is of the display with the digital camera and marked cover. The photograph is sent to the electrophoretic display, which displays the photograph on the electrophoretic display, thereby displaying both the image and the markings.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

FIG. 2A is an isometric front-top view of a cover for the display assembly of FIG. 1.

FIG. 2B is an isometric rear-top view of a cover for the display assembly of FIG. 1.

DETAILED DESCRIPTION OF THE PREFERRED EMBODIMENTS

Definition

In the context of this application an energy efficient lighting device must produce at least 50 lumens per watt. A light emitting diode (LED) is one example of an energy efficient lighting device.

Figure 1:
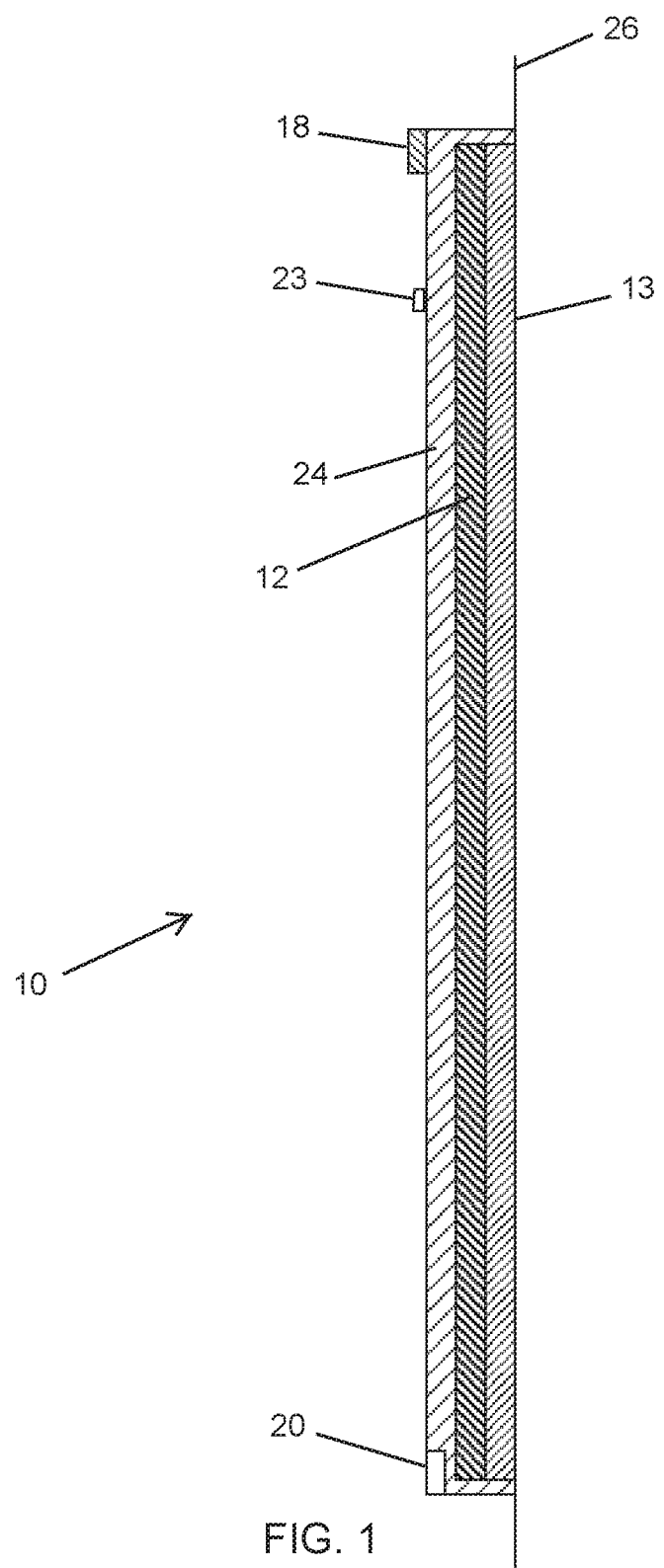
FIG. 1 is a side view of a first preferred embodiment of a display assembly, according to the present invention.
Figure 3A:
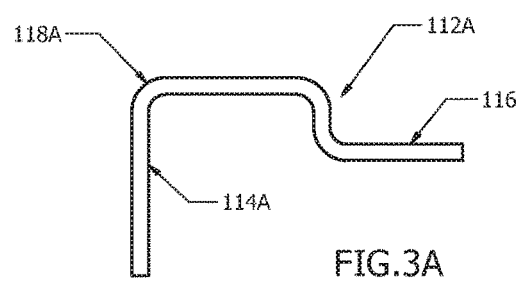
FIG. 3A is a sectional view of the periphery of an embodiment of the cover of FIGS. 2A and 2B.
Figure 3B:
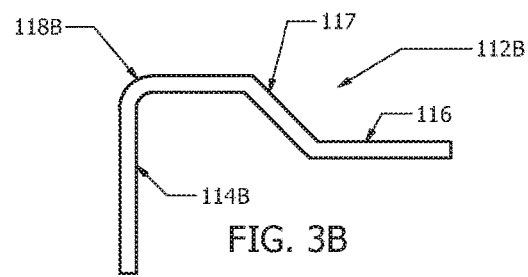
FIG. 3B is a sectional view of the periphery of an alternative embodiment of the cover of FIGS. 2A and 2B.
Figure 3C:
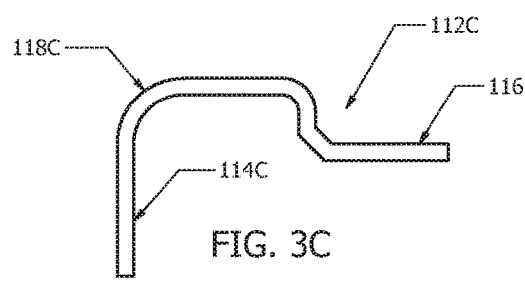
FIG. 3C is a sectional view of the periphery of an additional alternative embodiment of the cover of FIGS. 2A and 2B.
Figure 3D:
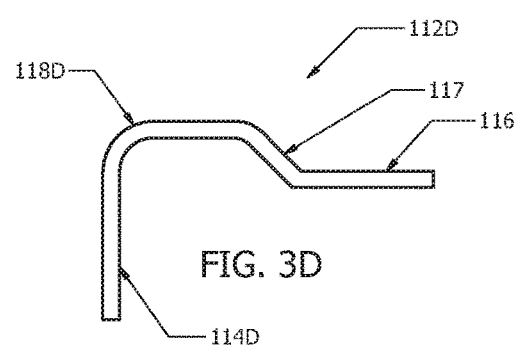
FIG. 3D is a sectional view of the periphery of another additional alternative embodiment of the cover of FIGS. 2A and 2B.
Figure 3E:
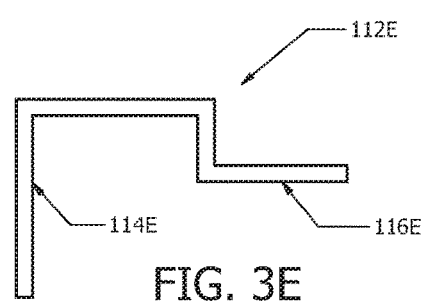
FIG. 3E is a sectional view of the periphery of yet another additional alternative embodiment of the cover of FIGS. 2A and 2B.

FIG. 1 shows an exploded sectional side view schematic representation of a media display board assembly 10 according to the present invention. A generally transparent polymer or tempered glass cover 12 includes embedded magnets 20 that retain cover 12 on a steel plate 13, which serves both as a magnet anchor and as the principal support of the media display board. Steel plate 13 is preferably of 26 to 35 gauge steel. Cover 12 is held in place by a set of rare earth magnets 20 (only one shown). A false border 18 is formed or printed on cover 12. This provides an impression of a frame to a user, while avoiding the added weight of the frames of prior art boards. Magnetic media 23 may be applied directly against steel plate 13 or on cover 12.

The assembly 10 and system described above have many advantages. Using the steel plate 13 as the structural support as well as the magnetic backing permits the creation of a lighter board, relative to currently available boards, of roughly one pound per square foot of board, versus about two pounds per square foot of board for currently existing boards. Further, because a thicker steel plate is used, more magnetic attraction is formed with the same power magnet. As a result, media may be magnetically retained on the exterior of the polymeric cover 12. This permits a system including magnetic media 23, designed to be stuck to the outside of the cover 12. For example, in a hospital setting, an assembly 10 can be provided on the door of each patient room, and magnetic media advisories can be attached as desired. For example, magnetic media 23 advisories for MRSA, could be kept on hand and deployed on assemblies 10 as required, to affect a warning to health care workers. Such magnetic media could be fashioned to be very prominent and to catch the attention of medical workers, more so than a simple message written using a marker. A magnetic media background 24 can be deployed directly on plate 13, to provide a semi-permanent background. For example, in the example given above, this could be provided for each room board 10, and changed seasonally to reflect different hospital initiatives.

In one embodiment plate 13 may be "dimpled"—that is, looking at plate 13 from the front a number of indents would be visible, and viewing from the rear, corresponding protrusions. These dimples both create some depth for plate 13 and provide a number of places where a drill can be used to broach plate 13, to permit the introduction of a fastener such as a wood screw, which may then by screwed into a wall (not shown) to support assembly 10. Also, a tray on the bottom of assembly 10 may be provided to hold markers and an eraser. In a preferred embodiment, this tray is attached lightly, so that it can easily snap off, and is made with edges that have all been blunted, as the steel trays currently in use have proven to be a hazard to those working with these boards, as some have been cut by the steel trays.

FIGS. 2A and 2B show a front and rear view, respectively, of a cover assembly 110 that includes a frame 112, which includes a rearward extending peripheral wall 114, the upper, horizontal portion of which permits assembly 110 to rest on the upward surface of steel plate 13 (FIG. 1). A clear polymeric or tempered glass panel 116 is thereby kept in front of plate 13, when desired. FIGS. 3A-3E show a detailed sectional view of each of five different configurations (112a-112e) for the frame 112. The purpose of these differing frames is to permit the assembly 110 to hang from the steel plate 13, to present an aesthetic appearance and to provide a border 18. In a preferred embodiment, the frame 112 is opaque and colored, to provide the illusion of an entirely separate frame. The protruding portion of frames 112a, 112c and 112e is ¾ of an inch wide, and for all frames 112a-112e the protruding portion juts out ¼ inch from panel 116. For frame 112b and 112d, the protruding portion is ½ inch wide with a sloping portion 117 adding another ½ inch of width. All peripheral walls 114a-114e extend to the rear by ¾ of an inch. From the side, for example viewed from a distance down a corridor, the entire assembly 110 will appear to be a solid unit protruding from the wall. In one preferred embodiment, peripheral wall 114 includes a flange extending inwardly toward the center of assembly 110, so that it interlocks with plate 13. Corners 118a and 118b have a radius of curvature of ⅛ inch, whereas 118c and 118d have a radius of curvature of ¼ inch. All of the corners of 112e are sharp, right angles.

Figure 4:
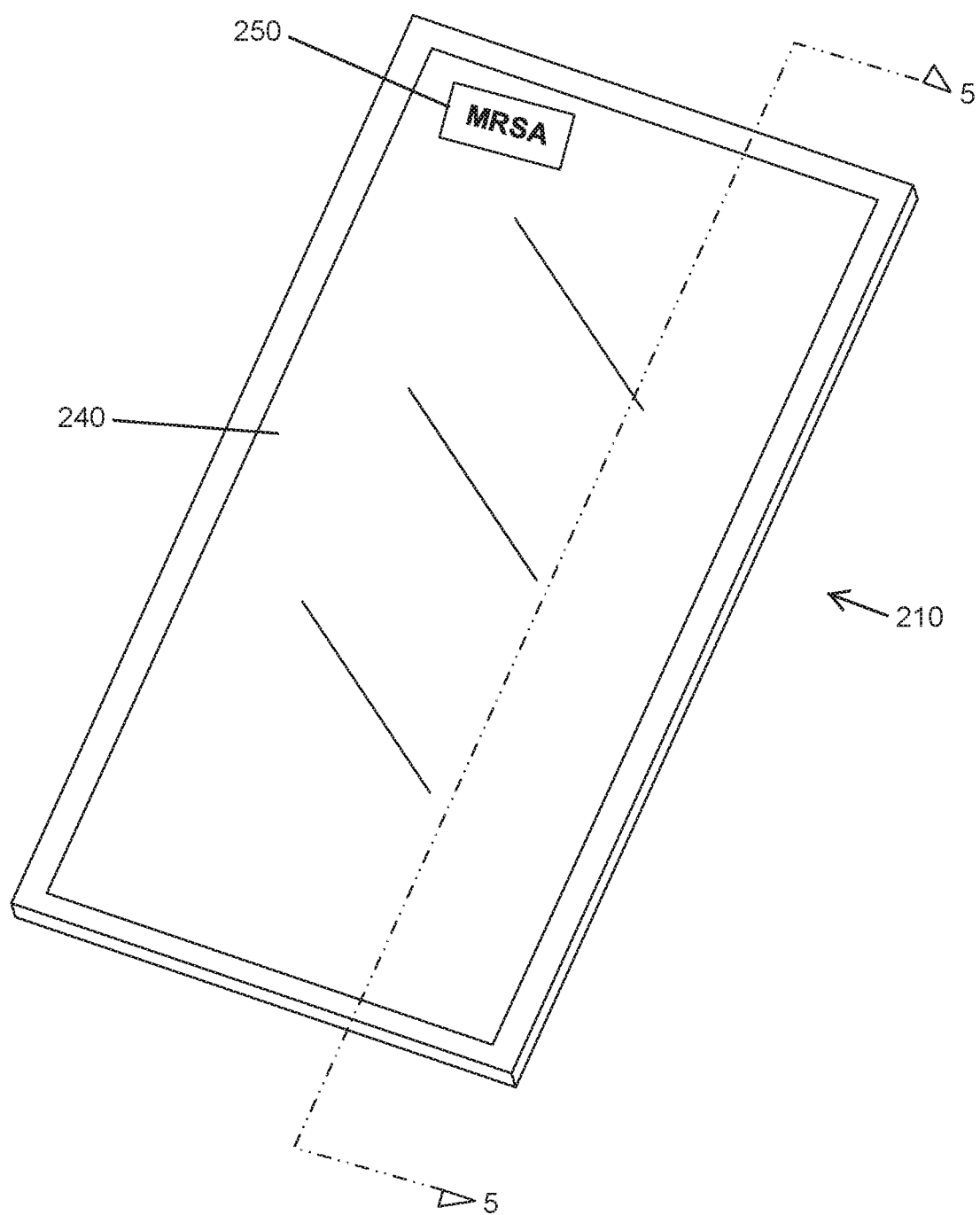
FIG. 4 is an isometric view of a second preferred embodiment of a display assembly, according to the present invention.
Figure 5:
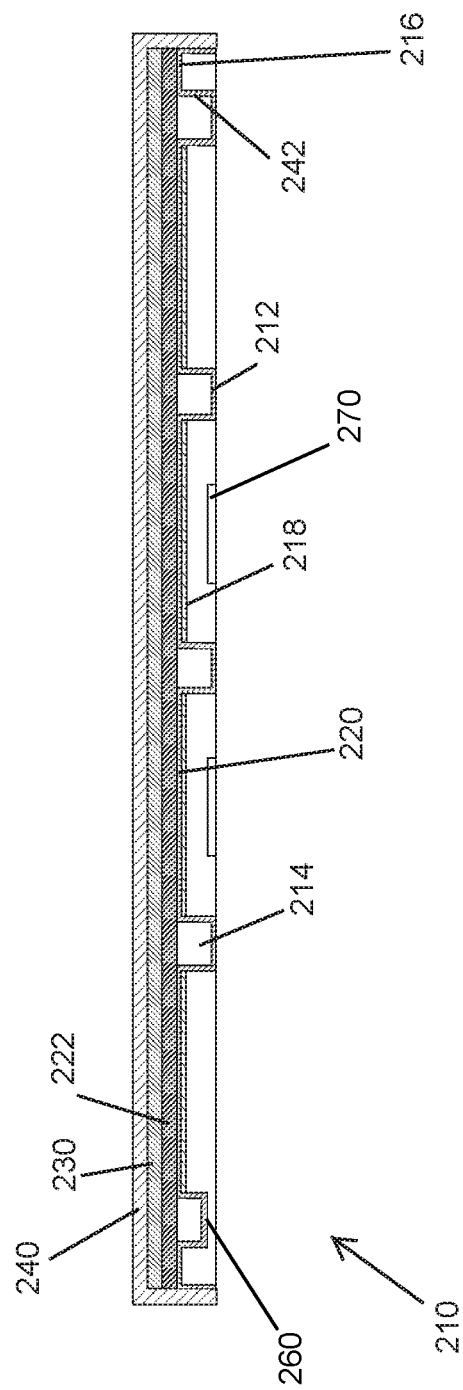
FIG. 5 is a sectional view of the display assembly of FIG. 4, taken along line 5-5 of FIG. 4.
Figure 6:
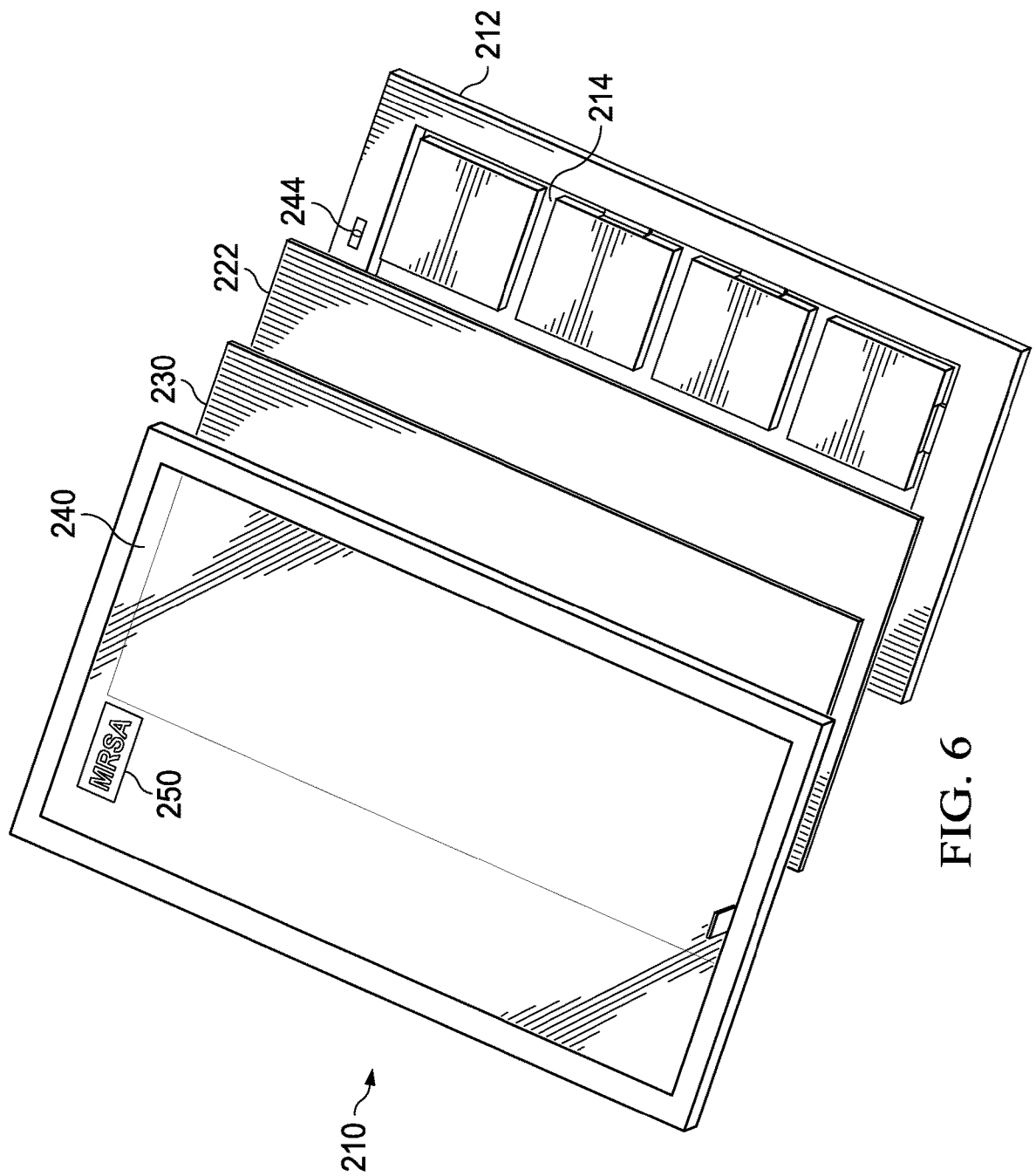
FIG. 6 is an exploded view of the display assembly of FIG. 4.

Referring to FIGS. 4 through 6, in an alternative preferred embodiment of a display assembly 210 a base 212 made of polymeric material includes a set of channels 214 and a peripheral wall 216, configured so that if the backside 220 of base 212 is pressed against a flat surface, both the back side of channels 214 and the furthest extent of peripheral wall 216, which are flush with each other, will lie flush on the flat surface. This permits easy attachment of base 212 to a wall, door or other surface, by means of a set of screws driven through the base 212 at one or more channels 214. A set of magnets 218 are either fastened to the backside 220 of base 212, inculcated into the polymeric material of base 212 or mounted in apertures in base 212. A steel plate 222 is then placed onto base 212 and is retained by means of magnets 218. Printed media 230, which in a preferred embodiment is rigid, is placed over plate 222, and retained by a generally transparent cover 240, made of polymer or tempered glass, that includes a peripheral rearward extending wall 242 that is retained by a slight pressure against peripheral wall 216, and by the top portion of peripheral wall 216 holding up the top part of rearward extending wall 242, which rests upon wall 216. The assembly further includes magnetic elements 250, for placing on cover 240, and having some graphical information on the side that is then visible to a viewer, to provide some indication to the viewer. Additionally, as shown in FIG. 6, a bubble level 244 is present in a portion of the base 212, to aid a workman in hanging the base 212, plumb. Such a level is also present in preferred embodiments 10 and 210'

The many advantages of assembly 210 may now be considered. The entire assembly can be quite light, as base 212, printed media 230 and cover 240 can be made of lightweight polymeric material and steel plate 222 can be as little as 0.1 mm thick, as in the embodiment of assembly 210 plate 222 is not used for structural support. If it is to be used in a hospital room, assembly printed media can indicate where information can be written on cover 240 with a marker provided for this purpose. If a patient is allergic to a medicine or a food, a magnetic element 250 bearing this information in a bright and bold manner may be placed on cover 240 and retained by magnetic force to plate 222, thereby providing a very clear warning, that may be very difficult to fail to notice. In this manner, a hospital can facilitate the task of the medical staff in ensuring that health care workers are clearly notified of the many important factors that must be taken into account in providing patient care. This is always a huge challenge in a busy hospital that must provide appropriate service to a broad array of patients having many idiosyncrasies in their conditions. Also, because no wood or laminated materials are used in assembly 210 it can be exposed to water, for example during a terminal clean, or as an outside display periodically exposed to rain or cleaning fluids, without fear of damage being incurred.

Because it is releasably retained by magnets 218, steel plate 222 does not obstruct installation of base 212, and further permits easy removal in the event that assembly 210 and the set of screws must be accessed for removal. Also, assembly 210, could be prepared with a graphic representing an organ or the human body as whole on printed media 230, thereby serving as an educational material that directly benefits patients. Such an assembly 210 would permit a physician to mark on the cover 240, for example to help explain a procedure to a patient, thereby greatly facilitating physician patient communications. Further, such an assembly could display the name of a pharmaceutical company or a pharmaceutical and could be distributed as a service to hospitals by a pharmaceutical company, without violating current law.

Further, using a set of assemblies 210, it would be possible to implement a system and method in a hospital for increasing staff awareness of patient conditions requiring special measures. Each of a set of patient rooms is equipped with an assembly 210 for each bed in the room. When a new patient is admitted to the room, patient identifying information is written on the cover 240 with markers that are also provided. Then, if the patient has a condition requiring special treatment, such as MRSA, a magnetic element 250, taken from a set of magnetic elements 250 provided, which collectively can provide warning for any one of a number of different conditions requiring special treatment is stuck on the cover 240 and retained magnetically by magnetic attraction to steel plate 222. Elements 250 may be color-coded by condition type and each may bear a distinctive design, so that a medical staff member is quickly made aware of the patient condition or conditions requiring special handling.

In a further detail, a pair of raised areas 260 in a transverse one of channels 214 facilitates attachment of a tray for markers. Such a tray is made of polymeric materials and is wedged into channel 214 and held in place by the channel walls and by raised areas 260. In like manner, a pair of raised areas 270 in a longitudinal channel facilitate the attachment of a marker tray if the board is oriented so that it extends horizontally more than vertically. The advantage of a marker tray made of a polymer and held in a channel by raised areas 260 or 270 is that if a person accidentally walks into such a tray it is easily dislodged. Accordingly, it is far less likely, both because of the softer polymeric material used and because it is more easily dislodged to injure a person who encounters it.

Figure 7:
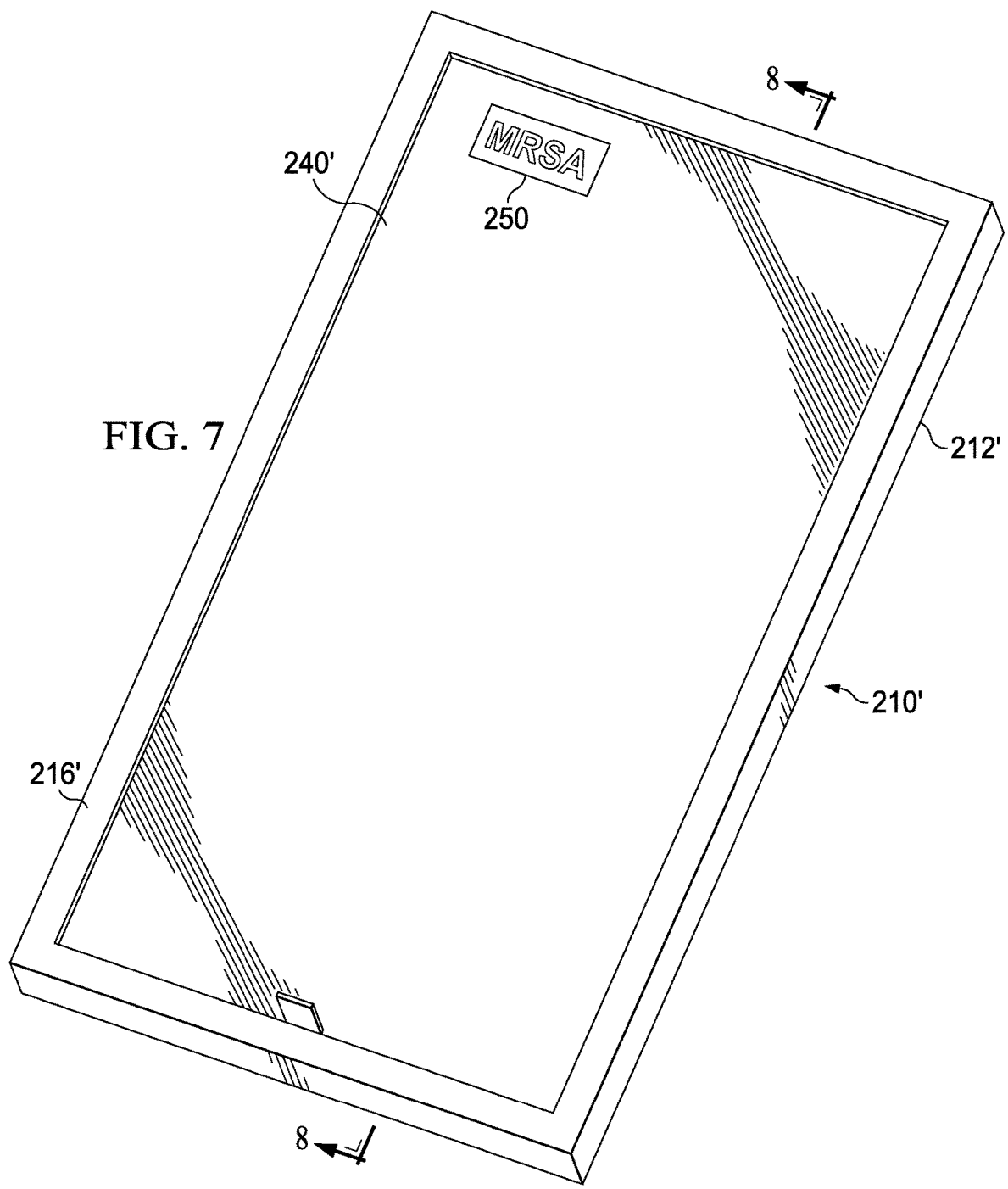
FIG. 7 is a perspective view of another alternative embodiment of a display assembly according to the present invention.
Figure 8:
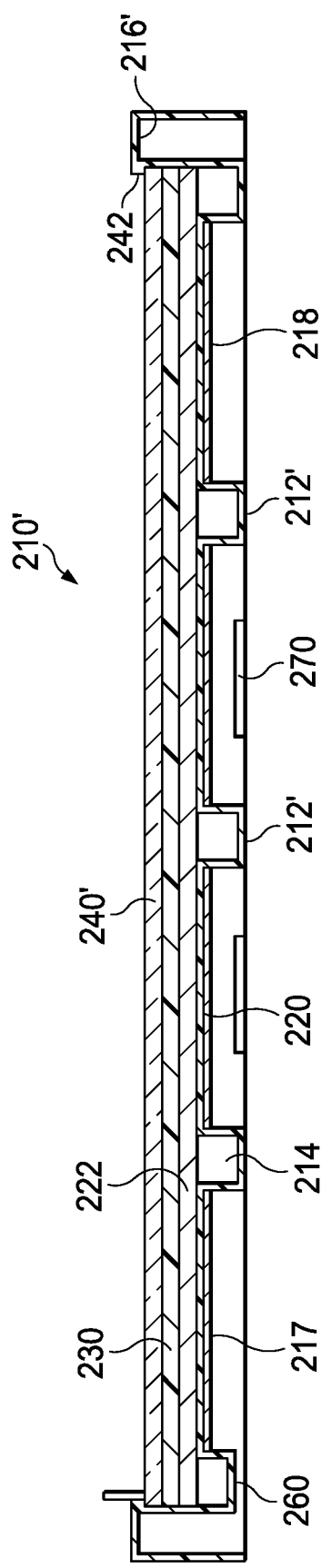
FIG. 8 is a sectional view of the display assembly of FIG. 7, taken along line 8-8 of FIG. 7.
Figure 9:
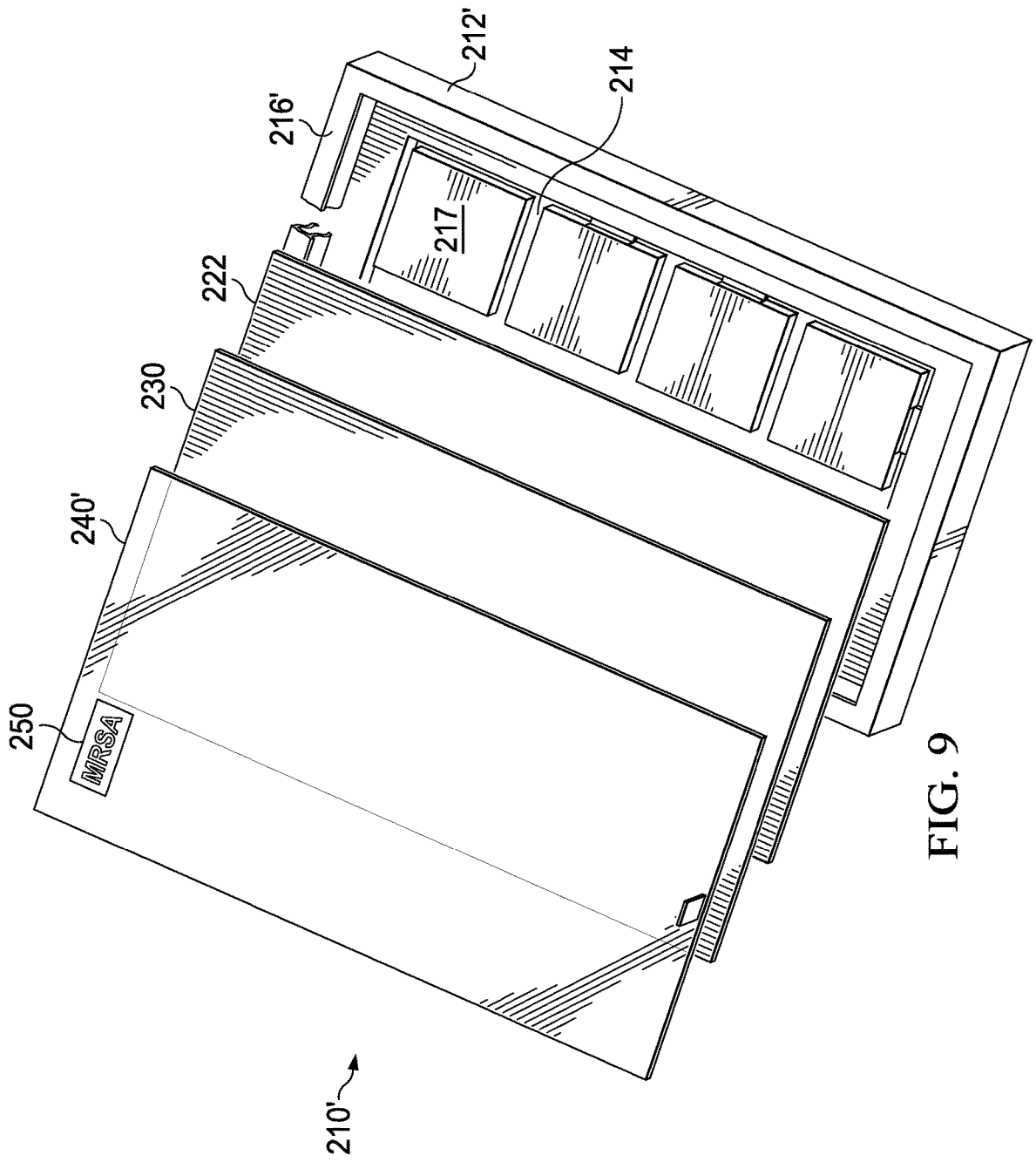
FIG. 9 is an exploded view of the embodiment of FIG. 7.

Referring to FIGS. 7-9, in an alternative embodiment of a display assembly 210', border (also referred to as a "frame") 216' is raised up relative to islands 217, so that a space is defined for steel sheet 222, display materials 230 and cover 240' can be fit and be retained by the resilient deformability of border 216'. In a preferred embodiment, as shown, a lip 242, also helps to retain cover 240' in place. Border 216' is deformed slightly as elements 222, 230 and 240' are positioned, and then resumes its previous shape, retaining these elements. Elements 214, 218 and 270 are the same as in the previously described embodiment. Cover 240' is the same as in previously described embodiment, except for that it is a flat sheet and does not have a rearwardly extending peripheral wall. Cover 240' may be made of polymeric material or tempered glass and includes a pullout element in the form of a tab at the bottom, by which a user may pull outwardly on the tab to pull cover 240' out from frame 216'. In an alternative preferred embodiment, the pullout tab is attached to the steel sheet 222, so that pulling on it brings all of the elements out from base 212'. A similar pullout element is provided in the embodiments described below. Although a gap is shown in frame 216' in FIG. 9, in a preferred embodiment there is no gap and the frame 216' is continuous, all the way around.

Figure 10:
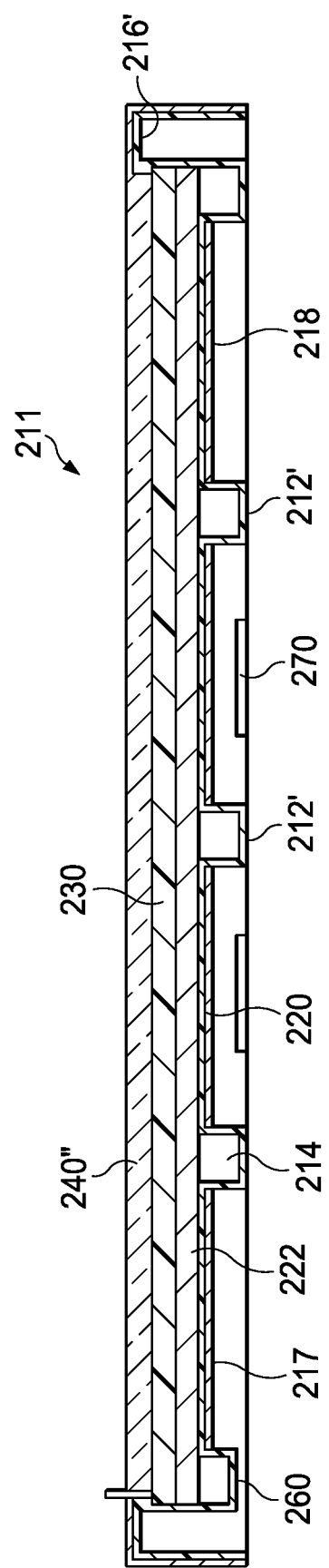
FIG. 10 is a sectional view of yet another alternative embodiment, taken along a line corresponding to line 8-8 of FIG. 7.

Referring to FIG. 10, in another embodiment 211, base 212' and elements 222 and 230 are the same as in the embodiment of FIG. 7, but an alternative cover 240" that fits generally conformally over base 212' and display media 230 is provided.

Figure 11:
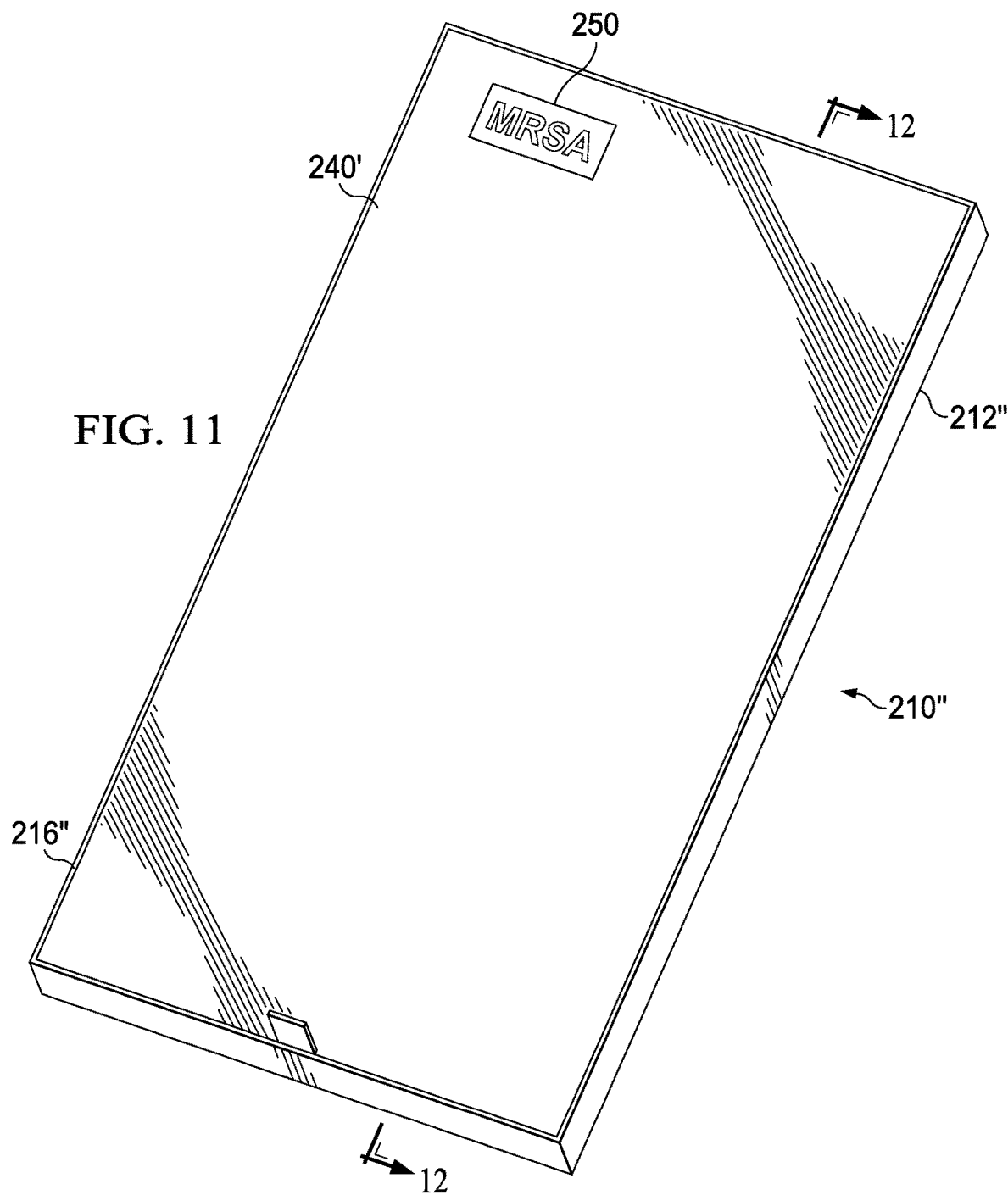
FIG. 11 is a perspective view of still another alternative embodiment of a display assembly.
Figure 12:
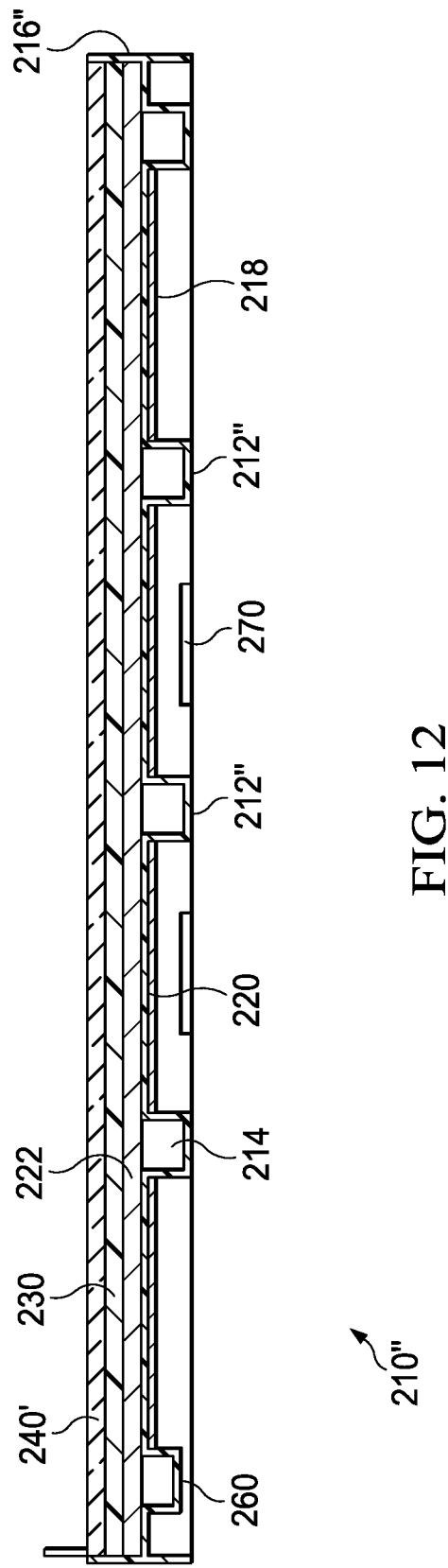
FIG. 12 is a sectional view of the embodiment of FIG. 11, taken along line 12-12.
Figure 13:
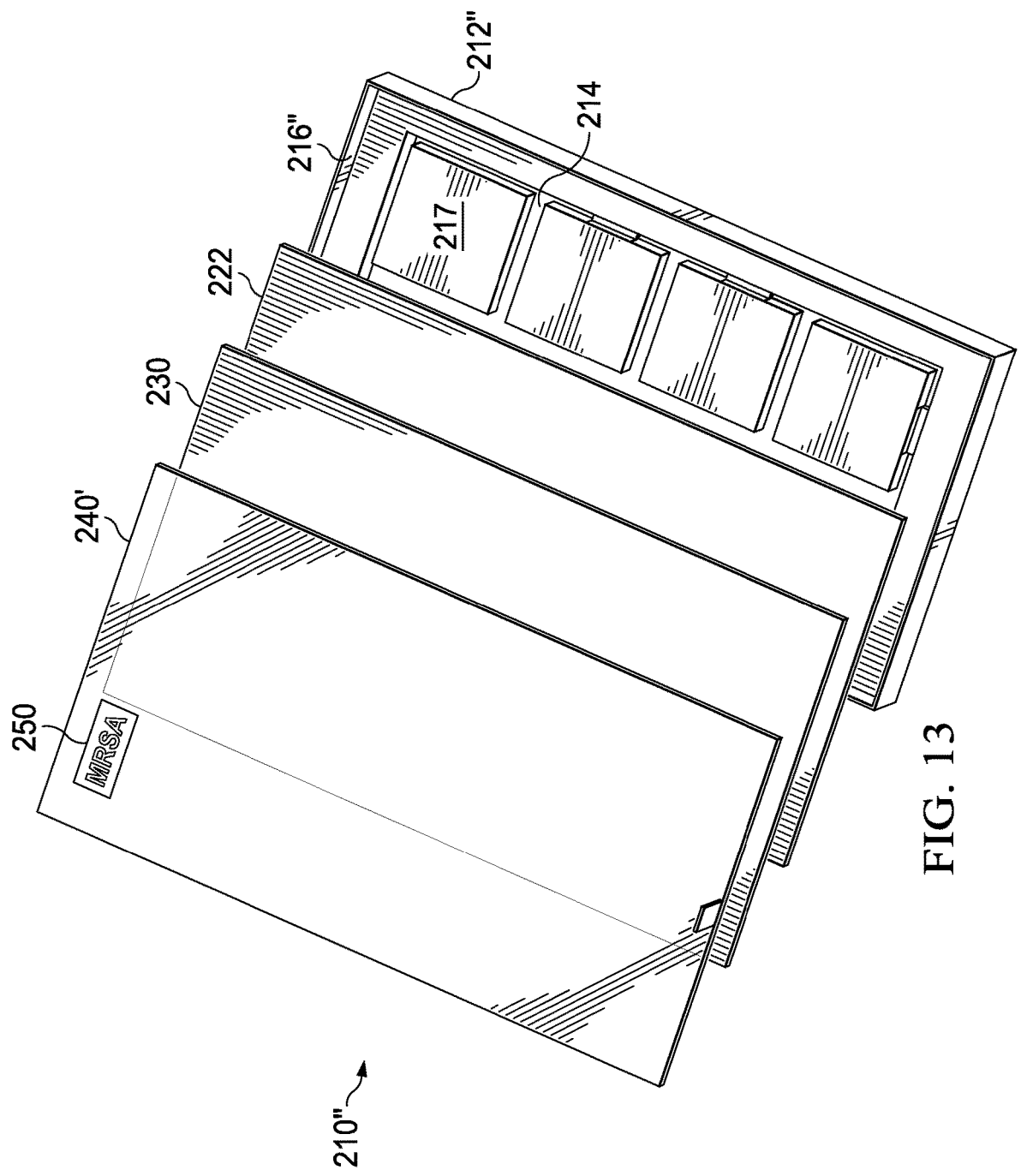
FIG. 13 is an exploded view of the embodiment of FIG. 11.

Referring to FIGS. 11-13, in a still further alternative embodiment of a display assembly 210", elements 222, 230 and 240' are the same as in the embodiment of FIG. 7, but the base 212" is different as margin 216" takes the form of a thinner sidewall, than the raised margin 216' of the embodiment of FIG. 7. Sidewall 216" has enough resilient deformability to stretch slightly to permit elements 222, 230 and 240' to be put in place, and then retained by pressure from sidewall 216". For the embodiment of FIG. 10 and this embodiment, elements 214, 218 and 270 are the same as for the embodiment of FIG. 1. For embodiments 210, 210' and 210" the steel sheet 222 is optional.

In a further aspect, there may be present in any of the embodiments 10, 210, 210', 211 or 210", a "keying" scheme which may be used to restrict the use of the assembly to display materials from a single source. For example, an element of a particular shape may extend out of margin 216', so that only display material having a matching shape will fit into the available area. The affordable care act greatly restricts the goods that pharmaceutical companies can provide for free to doctors to those goods that may be directly used to help patients. If the use of the display assembly 10, 210, 210', 211 or 210" is restricted to printed material that is provided directly by a pharmaceutical company and that aids the doctor in explaining a health condition, then this type of gift may be allowed. It is a particular advantage that the doctor can write on transparent cover 240 (or 240') to help explain a medical condition or treatment.

Figure 14:
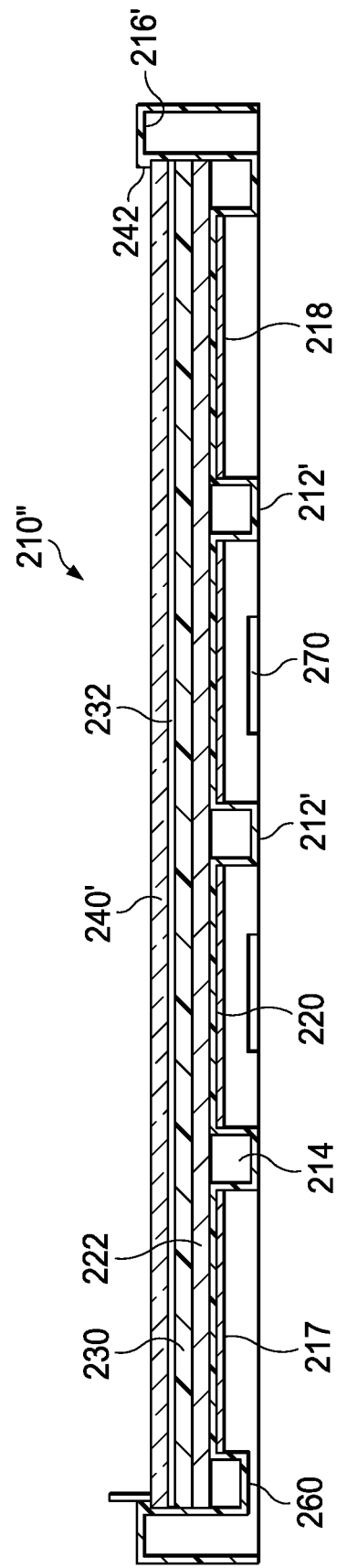
FIG. 14 is a sectional view of yet another alternative embodiment of a display, according to the present invention.

FIG. 14 shows another embodiment 210"', which is the same as embodiment 210', except for the thicknesses are such that there is a gap 232 between printed media 230 and transparent cover 240'. This is for the display of items having some thickness, in front of a background provided by the printed media 230. For example, some ribbons have a thickness that might present a challenge to accommodate in the embodiment of 210'. In one preferred embodiment gap 232 is less than 1 mm wide, but in an alternative preferred embodiment it is greater than 1 mm wide. In a further embodiment, the gap is less than 2 mm wide, but in another alternative preferred embodiment the gap is more than 2 mm wide. In yet another preferred embodiment, it is less than 5 mm wide, but in an alternative preferred embodiment the cap is greater than 5 mm wide.

Figure 15:
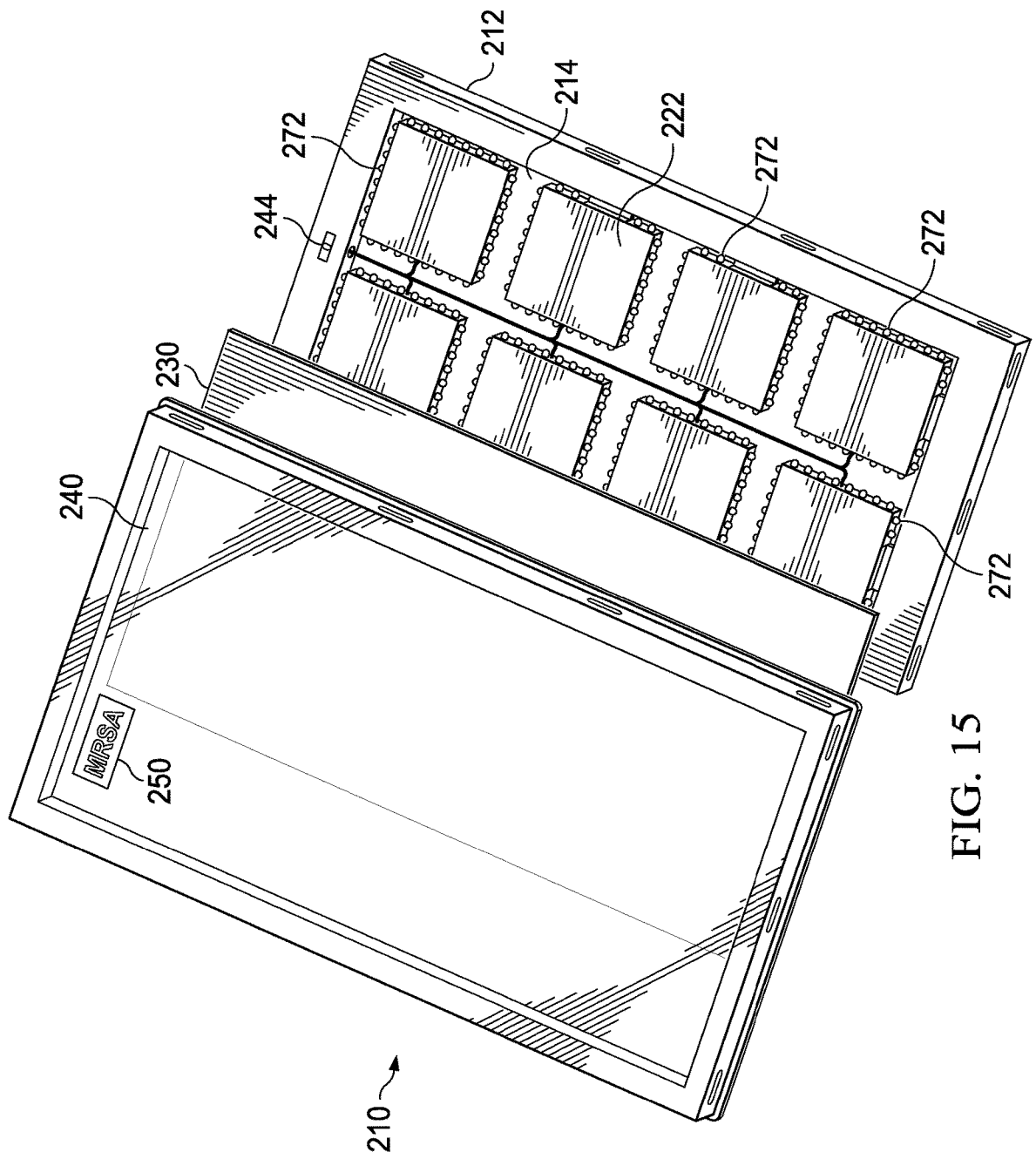
FIG. 15 is an exploded isometric view of a display assembly of still another alternative embodiment of the present invention, having backlighting.
Figure 16:
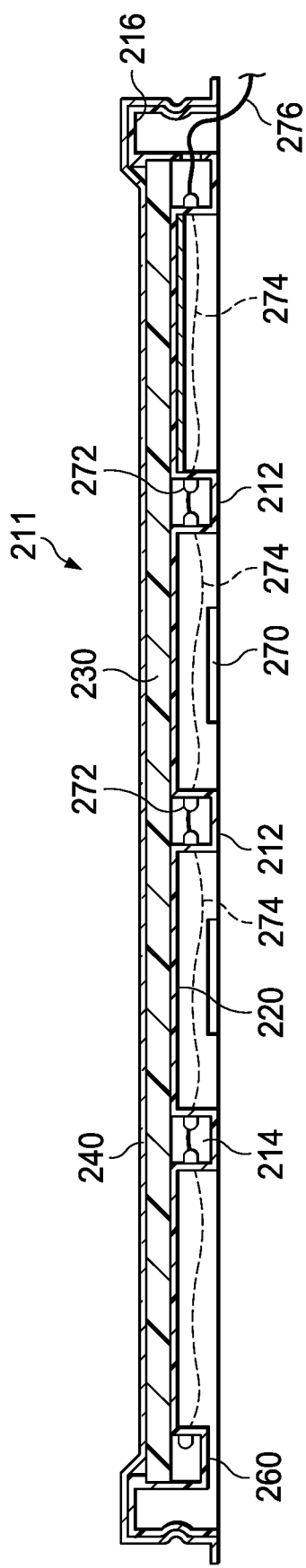
FIG. 16 is a side sectional view of the display assembly of FIG. 15.
Figure 17:
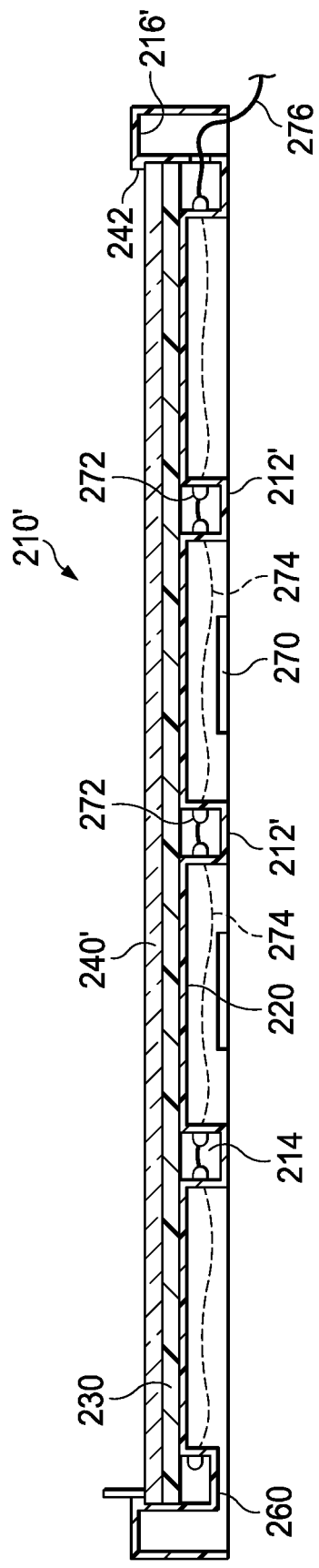
FIG. 17 is a side sectional view of a display assembly that is a variant of that of FIG. 15.
Figure 18:
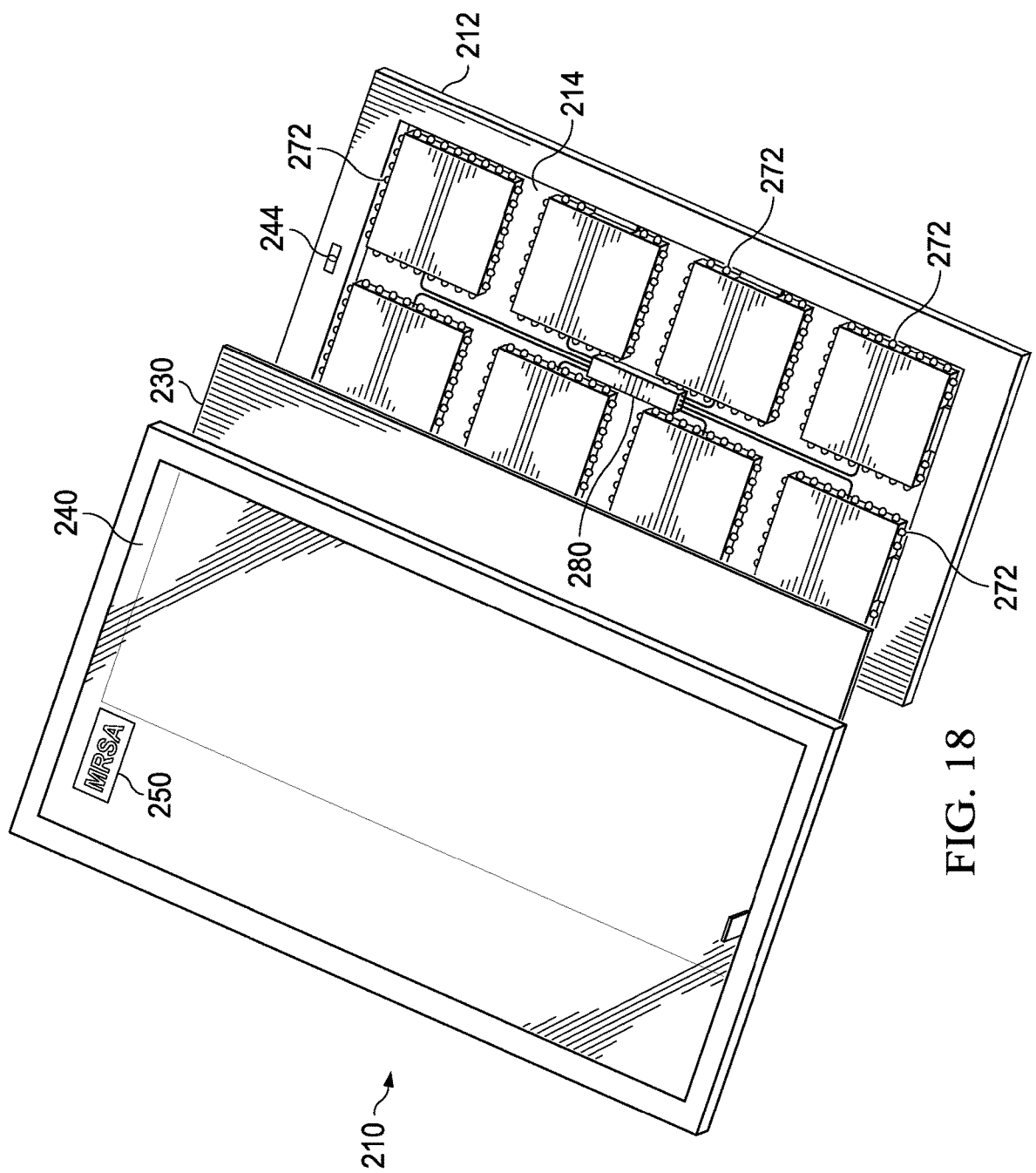
FIG. 18 is an exploded view of still another alternative embodiment of a display assembly, according to the present invention, having backlighting powered by a battery.
Figure 19:
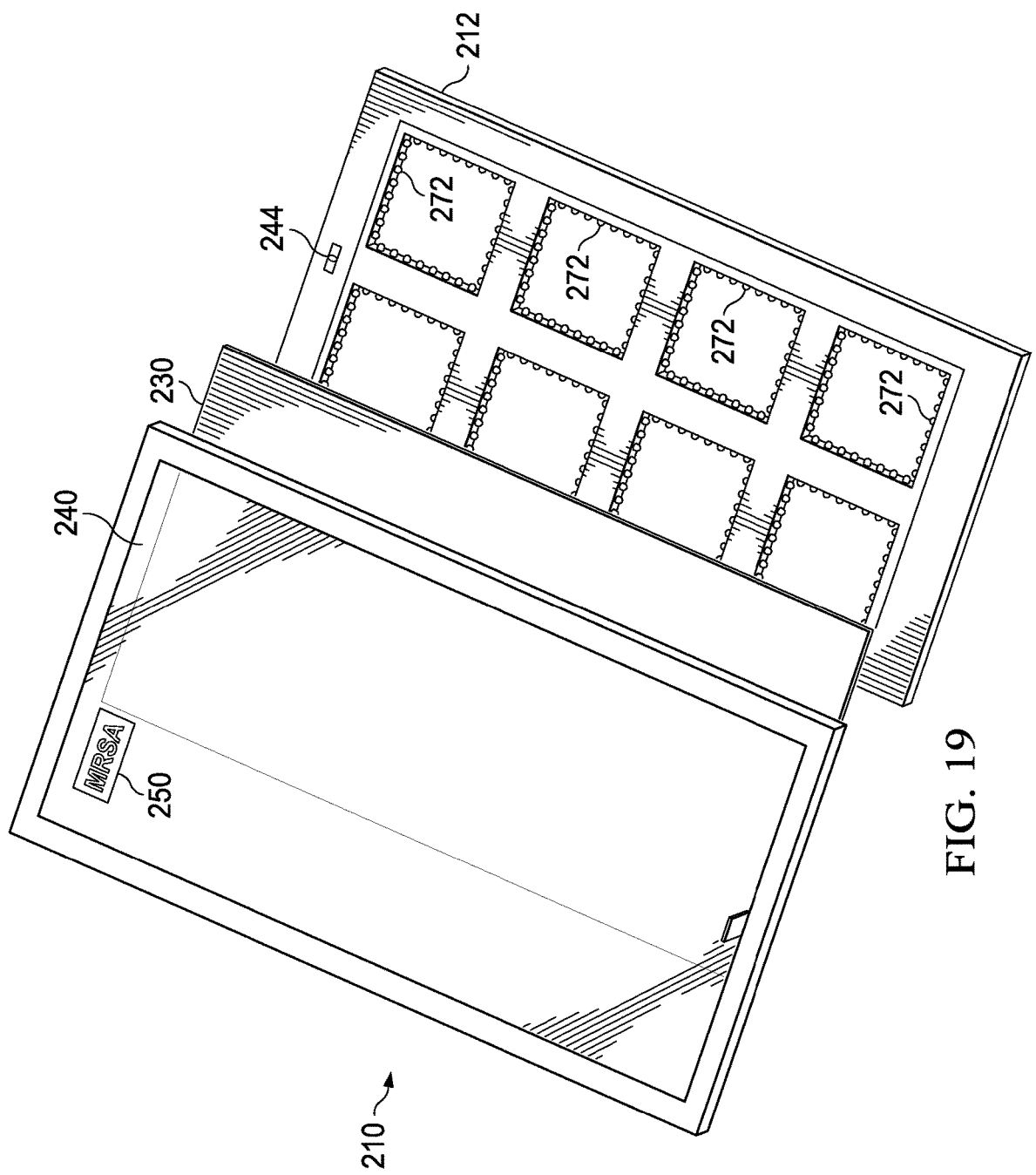
FIG. 19 is an exploded view of still another alternative embodiment of a display assembly according to the present invention, having backlighting in a variant arrangement.
Figure 20:
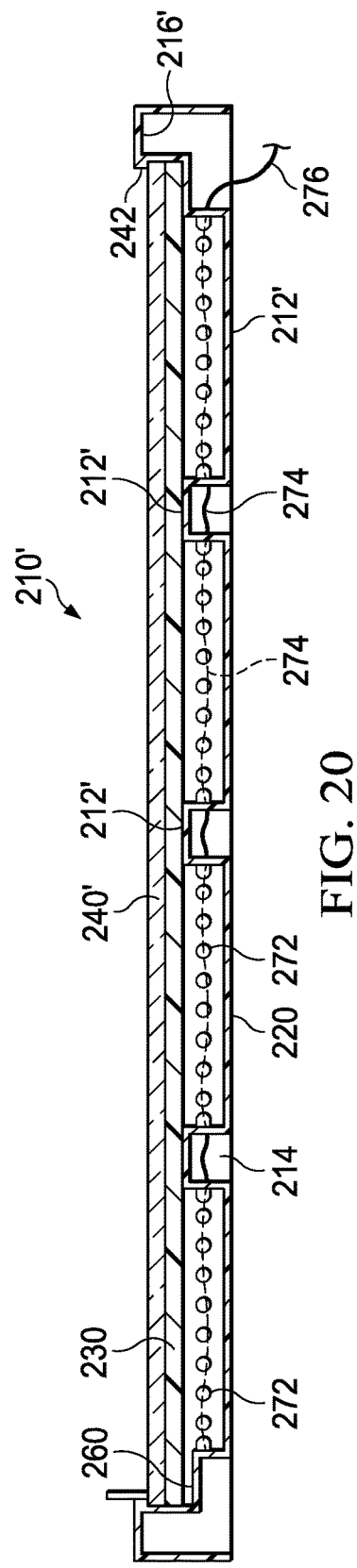
FIG. 20 is a side sectional view of still another alternative embodiment of a display assembly according to the present invention, having light and a cover that snaps into the base.

Referring to FIG. 15-17, in a preferred embodiment light emitting diodes (LEDs) 272, are connected with wires 274 to each other, and with an outer wire 276, leading to a source of electricity. In this embodiment, with LEDs 272 in channels 214, it is desirable for base 212 to be made of a translucent or transparent material, so that the light from LEDs can emanate outwardly to provide more even back illumination of media 230, which is itself translucent. FIG. 18 shows a different arrangement of LEDs 272, and also shows a battery 280, powering LEDs 272. Again, translucence for base 212 and media 230 is needed. FIGS. 19 and 20 show a different arrangement for LEDs 272 and base 212.

Figure 22:
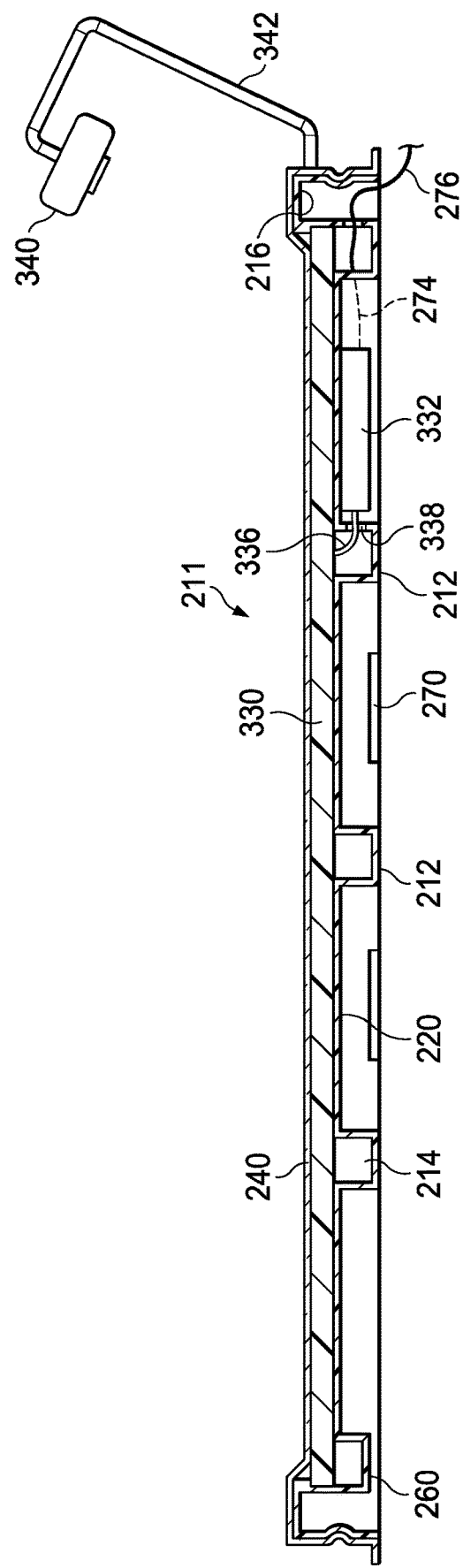
FIG. 22 is a side sectional view of the display assembly of FIG. 21, also having a camera.
Figure 21:
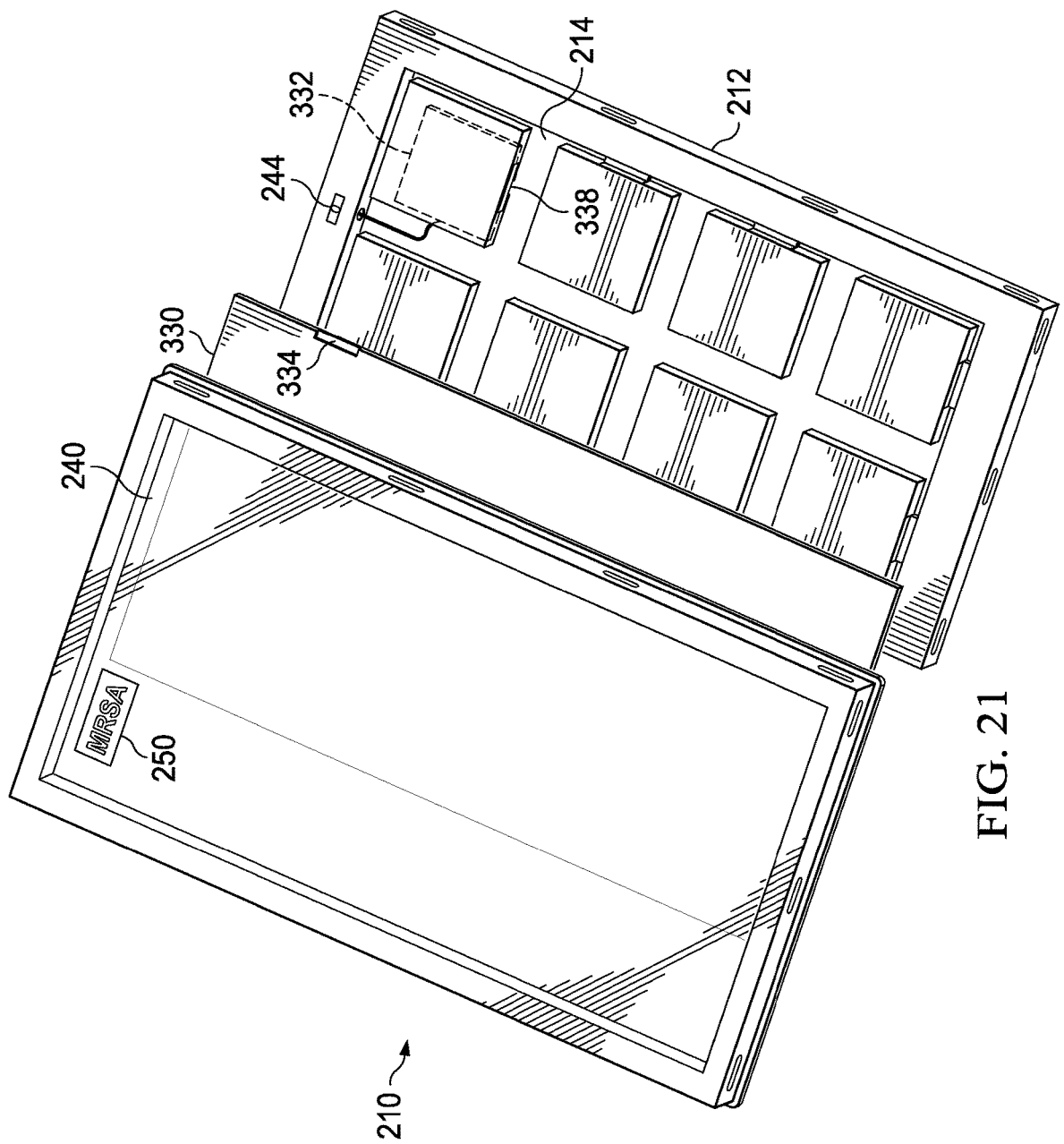
FIG. 21 is an exploded view of an alternative preferred embodiment of a display assembly according to the present invention, in which the display media is an electrophoretic display.

Referring to FIGS. 21 and 22, media 330 now takes the form of being an electrophoretic display, controlled by a system board 332 connected to a port 334 on display 330 by way of a connector 336 that passes through slot 338. FIG. 22 shows a camera 340 held in place by arm 342 and oriented to take a photograph of the front face of assembly 211. In one method of updating the display commanded by system board 332, a photograph is taken by camera 340 capturing the combination of the display 330 and markings on the cover 240. Because the position and angle of camera 340 is known, the effects of this perspective could be removed by a computer program. This image can then be sent to system board 332, to be shown on display 330. Accordingly, one can update and record display 330, by marking on cover 240 and then displaying the resultant combination image on display 330, after which further modification can be made by way of a similar process. Users could erase markings on cover 240, after an update of display 330, to have a fresh canvas to mark on.

Figure 23:
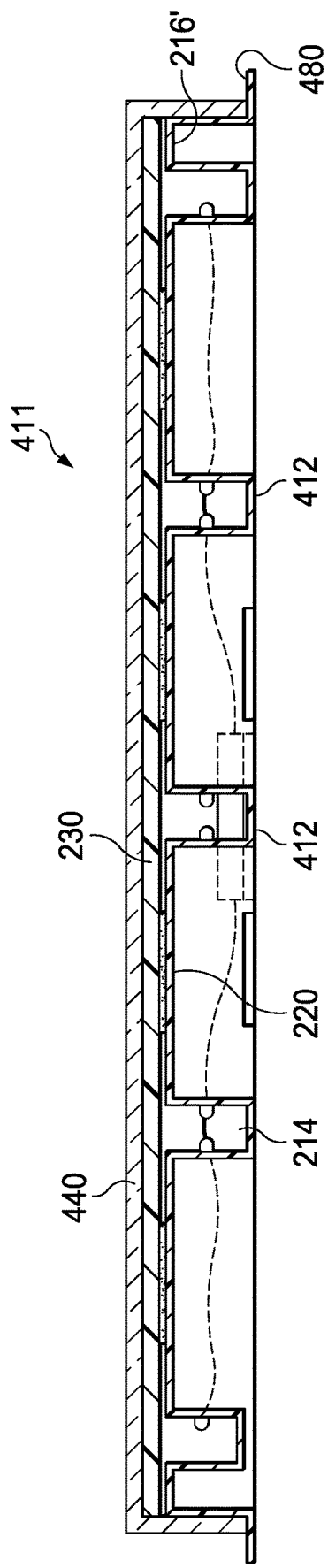
FIG. 23 is still another alternative preferred embodiment of a display assembly, in which a periphery of the base extends outwardly from the cover.

FIG. 23 shows an embodiment in which base 412, includes a peripheral rim 480 that extends outwardly from wall 216', and extends outwardly from cover 440, to be visible to an observer, showing as a rim about media 230. In the context of this application, the base 412 is covered by the cover 440 in this embodiment. Any of the embodiments shown and described in this application could be modified to have a peripheral rim, such as rim 480 without departing from the scope of the invention.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:
1. A display assembly, comprising:
   a. a base comprised of polymeric material, having a front wall of at least one hundred square centimeters in area, and a rearward-extending base peripheral wall of at least 0.5 cm height, said front wall having raised regions and having recessed regions, wherein said recessed regions are recessed such that the back of said recessed regions extend at least as far back as said peripheral wall at its furthest rearmost extent, so that when said base is placed against a flat surface said back of said recessed regions touch said flat surface;

b. a polymeric cover adapted to tension fit to said base, said polymeric cover including a generally transparent front wall;

c. translucent display media interposed between said base and said cover; and d. a set of energy efficient lighting devices disposed in said recessed regions.

2. The display assembly of claim 1, wherein said cover includes a rearward extending cover peripheral wall, sized to fit about said base peripheral wall, so that when said cover is placed over said base there is a slight tension between said cover peripheral wall and said base peripheral wall.

3. The display assembly of claim 1, further including a raised peripheral margin, from which said rearward-extending base peripheral wall extends, and wherein said raised regions are recessed relative to said raised peripheral margin, which has inwardly facing surfaces, into which said translucent display material is fit and said cover is tension fit and retained by tension from said inwardly facing surfaces.

4. The display assembly of claim 1, wherein said energy efficient lighting devices are light emitting diodes.

5. A display assembly, comprising:

a. a base comprised of polymeric material, having a front wall of at least one hundred square centimeters in area, and a rearward-extending base peripheral wall of at least 0.5 cm height, said front wall having raised regions and having recessed regions, wherein said recessed regions are recessed such that the back of said recessed regions extend at least as far back as said peripheral wall at its furthest rearmost extent, so that when said base is placed against a flat surface said back of said recessed regions touch said flat surface;

b. a polymeric cover adapted to fit over said base, said polymeric cover including a generally transparent front wall, and a rearward extending cover peripheral wall, sized to fit about said base peripheral wall, so that when said cover is placed over said base there is a slight tension between said cover peripheral wall and said base peripheral wall; and c. display media interposed between said base and said cover.

6. The display assembly of claim 5, wherein said base further includes a peripheral rim, extending outwardly from said furthest rearmost extent of said rearward-extending base peripheral wall, and wherein said polymeric cover is adapted to fit over said base by fitting about said base peripheral wall, leaving portions of said peripheral rim exposed.

7. The display assembly of claim 6, wherein said peripheral rim is continuous.

8. The display assembly of claim 5, wherein said display media is adhered to said base.

9. The display assembly of claim 8, wherein said display media is adhered to said base by means of a set of two-sided adhesive strips.

10. The display assembly of claim 9, wherein said two-sided strips are resiliently compressible.

11. The display assembly of claim 5, wherein energy efficient lighting devices are placed in said recessed regions, and wherein said display media is translucent, thereby permitting said display media to be backlit.

12. The display assembly of claim 11, wherein said base is translucent, thereby permitting more even backlighting of said display media.

13. The display assembly of claim 11, wherein said recessed regions are channels, dividing said raised regions.

14. The display assembly of claim 11, wherein said recessed regions are closed shapes, separated by said raised regions.

15. The display assembly of claim 5, wherein said display media is a reflective electrophoretic technology display module.

16. The display assembly of claim 15, wherein said base defines a passageway through said front wall and said base supports a driving board, communicatively coupled to said display module, by way of a cable passing through said passageway.

17. The display assembly of claim 15, wherein said base supports a battery, powering said display module.

18. The display assembly of claim 5, further including a digital camera and a digital camera support assembly, supporting said digital camera in front of said cover, so as to take a digital photograph of said display assembly, capturing writing on said cover over said display media.

19. The display assembly of claim 18, further including an actuator, which when actuated causes said digital camera to take a digital picture of said display assembly.

* * * * *